United States Patent
Kennedy

(10) Patent No.: US 6,926,046 B2
(45) Date of Patent: Aug. 9, 2005

(54) APPARATUS AND METHOD FOR FILLING TRAYS

(75) Inventor: T. Scott Kennedy, East Boothbay, ME (US)

(73) Assignee: Rynel, Inc., Boothbay, ME (US)

( * ) Notice: Subject to any disclaimer, the term of this patent is extended or adjusted under 35 U.S.C. 154(b) by 0 days.

(21) Appl. No.: 10/764,271

(22) Filed: Jan. 23, 2004

(65) Prior Publication Data

US 2005/0016623 A1 Jan. 27, 2005

Related U.S. Application Data

(60) Provisional application No. 60/442,862, filed on Jan. 27, 2003.

(51) Int. Cl.$^7$ ................................................ B65B 1/04
(52) U.S. Cl. ........................... 141/129; 141/67; 47/901
(58) Field of Search ................................ 141/129, 125, 141/67; 47/901, 1.01 P

(56) References Cited

U.S. PATENT DOCUMENTS

| | | | |
|---|---|---|---|
| 3,587,675 A | * | 6/1971 | Tucci .......................... 141/75 |
| 3,782,033 A | | 1/1974 | Hickerson ...................... 47/1 |
| 4,020,881 A | * | 5/1977 | Nothen ......................... 141/1 |
| 4,159,727 A | | 7/1979 | Visser ........................ 141/131 |
| 4,175,355 A | | 11/1979 | Dedolph ........................ 47/64 |
| 4,271,876 A | * | 6/1981 | Nash et al. .................... 141/12 |
| 4,747,766 A | | 5/1988 | Meulenbeke ................. 425/159 |
| 4,947,582 A | | 8/1990 | Visser ......................... 47/101 |
| 5,068,999 A | | 12/1991 | Visser ........................... 47/73 |
| 5,207,733 A | | 5/1993 | Perrin ........................... 47/87 |
| 5,209,014 A | | 5/1993 | Teichmann .................... 47/73 |
| 6,322,734 B1 | | 11/2001 | Zanten et al. ................. 264/42 |

FOREIGN PATENT DOCUMENTS

| | | |
|---|---|---|
| JP | 7-39256 A | 2/1995 |
| JP | 7-284345 A | 10/1995 |
| JP | 11-151046 A | 6/1999 |
| JP | 2001-258401 A | 9/2001 |

* cited by examiner

Primary Examiner—Steven O. Douglas
(74) Attorney, Agent, or Firm—Dana M. Gordon; Foley Hoag LLP

(57) ABSTRACT

One aspect of the present invention relates to an apparatus for filling trays with polymerized growth medium. Another aspect of the present invention relates to a method of filling a tray with polymerized growth medium using an apparatus of the present invention.

22 Claims, 10 Drawing Sheets

APPARATUS AND METHOD FOR FILLING TRAYS

RELATED APPLICATIONS

This application claims the benefit of the filing date of U.S. Provisional Patent Application Ser. No. 60/442,862, filed Jan. 27, 2003.

BACKGROUND OF THE INVENTION

Growth plugs are small independent segments of stabilized media which can house a variety of biological objects. The plugs typically serve as a medium for plant material, e.g., seeds, seedlings or cuttings, that will eventually be transplanted into a new environment. In addition to serving as a growth medium, such plugs can be used for propagation, germination, rooting, micro propagation, clonal propagation, and a variety of in vitro techniques. Growth plugs are commonly used as an environment for seeds, seedlings or cuttings, often followed by transplantation.

Growth plugs usually consist of a block of growth medium, e.g., about 2 to 3 inches long and ½ to 1 inch in diameter. The growth medium may include soil, peat, mulch, thatch, sand or any other organic, inorganic or gel substrate, depending on the environment most suited to the cutting, seed or seedling. Typically, the plugs will house a cutting, seed or seedling; however, they can be fashioned to house larger growths, including saplings and immature shrubs.

The growth plugs provide a compact, economical and stable medium in which to house plant material for sale. Most decorative plants and flowers for home gardens are sold in growth plugs. The growth plugs are often housed in flats or trays constructed of polyethylene, polystyrene or poly(vinyl chloride) (PVC) plastic. This lightweight plastic has become the material of choice for filling flats and trays because it is inexpensive to manufacture and easy to ship and store. Each tray is typically designed as a block with, for example, four to six, tray cavities with tapered ends that hold the individual plugs. The bottom of each cavity is usually solid, with either a few small holes or one large hole to facilitate drainage from the housed plug. The sides of the cavity may be smooth or porous. Alternatively, open-ended cavities may be used, to increase airflow around the growth plugs, resulting in better growth. The plugs are compressed into the cavities, and, depending on the hardiness of the particular variety of plant, the flats may provide a sustainable environment for the cutting, seed or seedling for many weeks.

Growth plugs made of composite polymerized medium, such as the medium described in U.S. Pat. No. 6,322,734, issued to Zanten et al., are frequently used in growth trays as described above. Such polymerized growth media have many advantages over traditional media, such as soil and peat moss. For example, a polymerized growth plug holds its shape without the need for a pot to retain the medium, reducing the cost of manufacture and transport. Such polymerized media are typically mixed in a slurry, comprising a mixture of aggregate (including but not limited to peat, bark, coconut fiber, etc.), water, surfactant (e.g., lecithin, alkylsulfonates or phospholipids), and a polyurethane prepolymer, e.g., a hydrophilic polyurethane prepolymer. When the prepolymer is mixed with the other components, the prepolymer begins to polymerize, generating carbon dioxide. The carbon dioxide causes the slurry to rise, not unlike a cake rises from gas created by yeast, and the polymerization of the prepolymer stabilizes the resultant substance, not unlike the effect of egg in a cake. The reaction time is temperature or pH dependent or both; for example, the higher the temperature, the shorter the time it takes the mixture to rise and polymerize. In a typical reaction at 70 F, the mixture begins generating carbon dioxide within approximately five to ten seconds after mixing, with full rise within one to two minutes and a stable growth plug within approximately six minutes.

Various methods of manufacturing growth plugs are known in the art. U.S. Pat. No. 6,322,734, issued to Zanten et al., describes composition of polymerized growth plugs and a method for continuous filling of trays. The components of the polymerized growth medium are combined in a mixer and then emptied into trays as they pass beneath the mixer by means of a conveyor belt. A weighing device measures an appropriate amount of slurry for the tray being used.

U.S. Pat. No. 5,209,014, issued to Teichmann, discloses the use of a "mold tool" which is filled with composite growth medium, creating a growth plug or "mold" into which seeds may be planted. The molds are filled individually, rather than in a tray or array configuration. Using a rotating table, the molds are passed through various stations in a machine, at which stations components of the composite are added.

U.S. Pat. No. 4,175,355, issued to Dedolph, discloses a method of forming polymerized growth plugs individually in cylindrical molds. The molds are sprayed with a nonphytotoxic release agent, then individually filled from a nozzle with polymerized growth medium in a slurry form.

U.S. Pat. No. 4,159,727, issued to Visser, discloses a machine for filling a plurality of individual pots with soil from a hopper as the pots pass underneath the hopper on an endless-chain type conveyor. Excess soil which spills over the tops of the pots is pushed onto an elevator and returned to the hopper.

Also known are methods for filling trays containing multiple tray cavities with various thick fluid substances. U.S. Pat. No. 4,747,766, issued to Van Meulenbeke, is directed to a machine for filling trays with chocolate or another thick fluid substance. It discloses a machine in which trays containing an array of tray cavities pass on a conveyor belt beneath a tank containing the thick fluid substance. The tank features apertures in its underside that line up with the cavities, allowing the simultaneous filling of an entire row of tray cavities.

Remarkably, the present invention provides a machine and methods to mix the slurry and deposit it uniformly and quickly into trays, distributing it evenly over multiple tray cavities, such that growth plugs of a desired size, shape, and density may be rapidly and easily produced, before the slurry cures into a firm growth plug. Notably, the machine and methods should provide the flexibility to accommodate trays and tray cavities of a variety of sizes, as well as the ability to create growth plugs with different densities to suit the requirements of a wide variety of plant species.

SUMMARY OF THE INVENTION

One aspect of the present invention relates to an apparatus for filling trays with polymerized growth medium, comprising: a plurality of feed rollers which propel a tray containing at least one tray cavity downstream through a filling region; a slurry dispenser nozzle which deposits polymerized growth medium in a slurry state on the tray, positioned downstream of the feed rollers; and a filler roller, positioned downstream of the slurry dispenser nozzle, which distributes the polymerized growth medium into and over the at least one tray cavity.

In certain embodiments, the aforementioned apparatus further comprises at least one brush, positioned downstream of the filler roller, which removes excess polymerized growth medium from the tray. In certain embodiments, the at least one brush is a rotary brush.

In certain embodiments, the plurality of feed rollers further comprises at least one top feed roller positioned above the top surface of a tray, and at least one bottom feed roller positioned below the bottom surface of a tray. In certain embodiments of the aforementioned apparatus, the vertical position of the at least one top feed roller is adjustable; and the vertical position of the at least one bottom feed roller is adjustable independently of the vertical position of the at least one top feed roller. In certain embodiments of the aforementioned apparatus, the feed rollers rotate at a feed roller rate; the filler roller rotates at a filler roller rate; and the feed roller rate and the filler roller rate are independently adjustable.

In certain embodiments, the aforementioned apparatus further comprises at least one brush, positioned downstream of the filler roller, which removes excess polymerized growth medium from the tray, and wherein the plurality of feed rollers further comprises at least one top feed roller positioned above the top surface of a tray, and at least one bottom feed roller positioned below the bottom surface of a tray. In certain embodiments of the aforementioned apparatus, the vertical position of the at least one top feed roller is adjustable; and the vertical position of the at least one bottom feed roller is adjustable independently of the vertical position of the at least one top feed roller. In certain embodiments of the aforementioned apparatus, the feed rollers rotate at a feed roller rate; the filler roller rotates at a filler roller rate; and the feed roller rate and the filler roller rate are independently adjustable.

In certain embodiments of the aforementioned apparatus, the plurality of feed rollers further comprises at least one top feed roller positioned above the top surface of a tray, and at least one bottom feed roller positioned below the bottom surface of a tray. In certain embodiments of the aforementioned apparatus, the vertical position of the at least one top feed roller is adjustable; and the vertical position of the at least one bottom feed roller is adjustable independently of the vertical position of the at least one top feed roller.

In certain embodiments, the aforementioned apparatus further comprises at least one brush, positioned downstream of the filler roller, which removes excess polymerized growth medium from the tray. In certain embodiments of the aforementioned apparatus, the at least one brush is a rotary brush.

Another aspect of the present invention relates to a method of filling a tray with polymerized growth medium using an aforementioned apparatus, comprising feeding a tray containing at least one tray cavity between at least one top feed roller and at least one bottom roller downstream at a tray feed rate through a filling region; depositing the polymerized growth medium in a slurry state from a slurry dispenser nozzle onto the tray; and rotating a filler roller at a filler roller rotation rate to distribute the polymerized growth medium into and over the at least one tray cavity.

In certain embodiments, the aforementioned method further comprises removing excess polymerized growth medium with at least one brush.

In certain embodiments, the aforementioned method further comprises granulating the removed excess polymerized growth medium and returning it to a mixing chamber from which polymerized growth medium is fed to the slurry dispenser nozzle.

In certain embodiments, the aforementioned method further comprises controlling the density of the polymerized growth medium in the at least one tray cavity by adjusting the filler roller rotation rate relative to the tray feed rate.

In certain embodiments, the aforementioned method further comprises removing excess polymerized growth medium with at least one brush.

In certain embodiments, the aforementioned method further comprises granulating the removed excess polymerized growth medium and returning it to a mixing chamber from which polymerized growth medium is fed to the slurry dispenser nozzle.

In certain embodiments of the aforementioned method, the tray feed rate is selected so that approximately six minutes elapses between the step of depositing the polymerized growth medium and the step of removing excess polymerized growth medium. In certain embodiments of the aforementioned method, the tray feed rate is selected so that the polymerized growth medium is substantially cured at the time of the step of removing excess polymerized growth medium.

BRIEF DESCRIPTION OF THE FIGURES

FIG. 1 depicts a schematic side view and face view of an embodiment of a tray filling machine of the present invention.

DETAILED DESCRIPTION OF THE INVENTION

Definitions

For convenience, certain terms employed in the specification, examples and claims are collected here.

The term "cavity" means a void or empty space within a body.

The term "growth plug" means an independent segment of stabilized media used to act as an environment for seeds or any plant material which needs to be in a consistent media prior to transplantation.

The term "polymerized growth medium" means a mixture of aggregate (including but not limited to peat, bark, coconut fiber or other suitable fibrous material), water, surfactant, and a polyurethane prepolymer, e.g., a hydrophilic polyurethane prepolymer, used to construct growth plugs.

The term "slurry" means polymerized growth medium in its wet, uncured state.

The term "stabilized media" or "stabilizing media" means an intervening environment through which something functions and thrives that is shaped into a fixed form which is not easily degraded. Stabilized media can include polymerized growth media, organic or inorganic material, or a gel substrate.

Overview

The present invention describes an apparatus and methods which allow the filling of a variety of plant propagating trays with a polymerized growing mix. To provide an overall understanding, certain illustrative embodiments will now be described; however, it will be understood by one of ordinary skill in the art that the devices and methods described herein can be adapted and modified to provide devices and methods for other suitable applications and that other additions and modifications can be made without departing from the scope of the systems described herein. The preferred embodiments can best be understood with reference to the Figures.

Preferred Embodiments

Figure 1B:
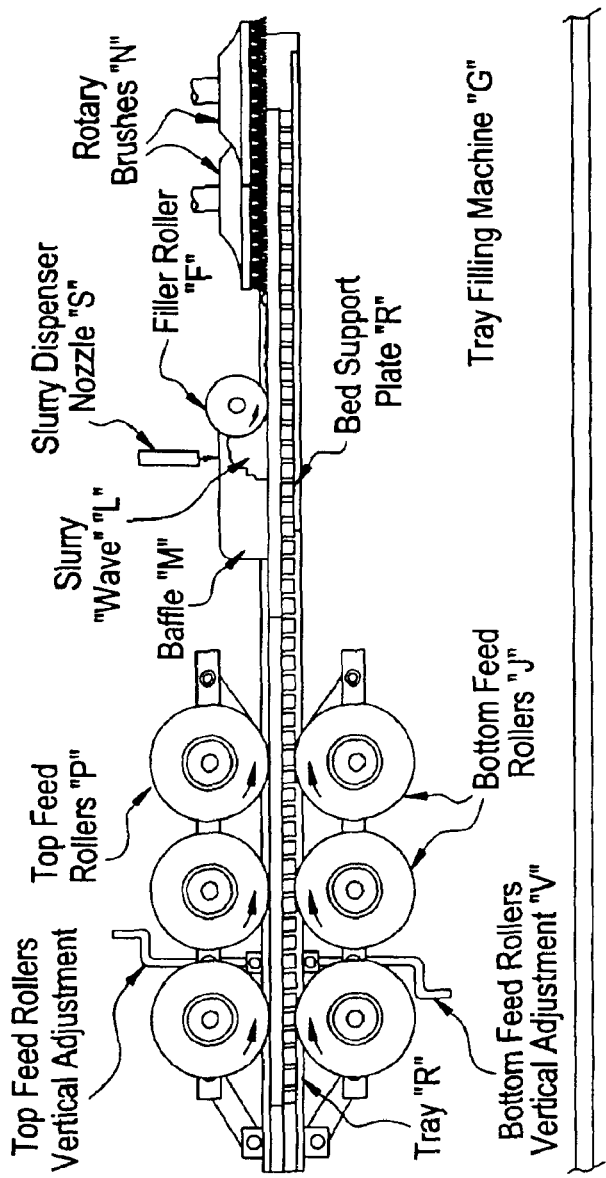
FIG. 1B depicts the side view of an embodiment of a tray filling machine.
Figure 1A:
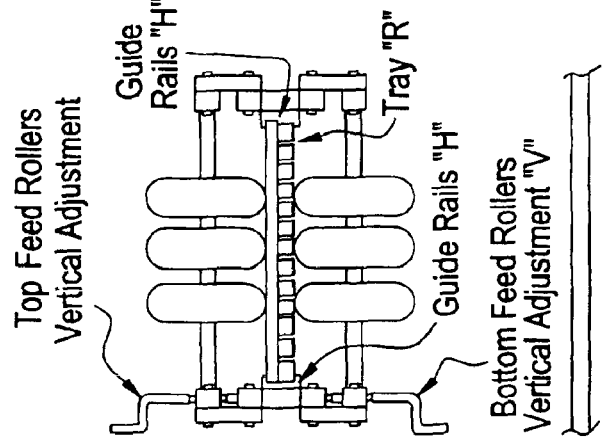
FIG. 1A depicts the face view of an embodiment of a tray filling machine, viewed from the upstream end.

Referring to FIGS. 1A and 1B, the machine consists of a frame in which are mounted a set of guide rails H, a set of top feed rollers P, and a set of bottom feed rollers J. In the illustrated embodiment, the top and bottom feed rollers are each arranged into arrays of nine rollers each, although other numbers and configurations of rollers may be employed. During operation of the machine, a tray R, containing tray cavities for receiving polymerized growth medium in slurry form, travels through a filling region defined by the space between the two guide rails. The guide rails support the tray R as it propagates through the filling region, while the feed rollers P and J grip the tray from the top and bottom and impart linear motion to it by rotating in opposing directions. An advantage of the use of feed rollers over a traditional conveyor belt arrangement is that the top and bottom feed rollers P and J grip the tray R with more friction than a conveyor belt. This can help prevent trays from jamming in the machine, as discussed further below in connection with the action of the fill roller F on the slurry wave L.

In a preferred embodiment, the top and bottom feed rollers P and J may be constructed of rubber, a flexible polymer, such as polyvinyl chloride (PVC), or other suitable material, and are inflated with air. The degree of softness of the rollers may be adjusted by varying the internal air pressure. This feature is important since some trays are fragile, and may be crushed if gripped too firmly. Alternatively, the top and bottom feed rollers may be solid, constructed of some suitably soft material, e.g., foam rubber.

In a preferred embodiment, the space between the top feed rollers P and the bottom feed rollers J can be adjusted to accommodate trays of varying thickness. In addition, the adjustment of the top feed rollers P may be independent of the adjustment of the bottom feed rollers J, to accommodate different configurations and to allow varying the mean height of the tray to optimize the feeding characteristics. In a preferred embodiment, adjustability of the vertical position of the top and bottom feed rollers P and J is achieved by means of a threaded crank. As illustrated in FIGS. 1A and 1B, the vertical position of the top feed rollers P may be adjusted by the top feed rollers vertical adjustment crank T, which, when turned, raises and lowers the assembly in which the top feed rollers P are mounted. The bottom feed rollers J may be adjusted similarly and independently by means of bottom feed rollers vertical adjustment V. To further enhance the flexibility of the apparatus, the guide rails H can be easily removed and replaced with others to match trays of a different profile.

Figure 2:
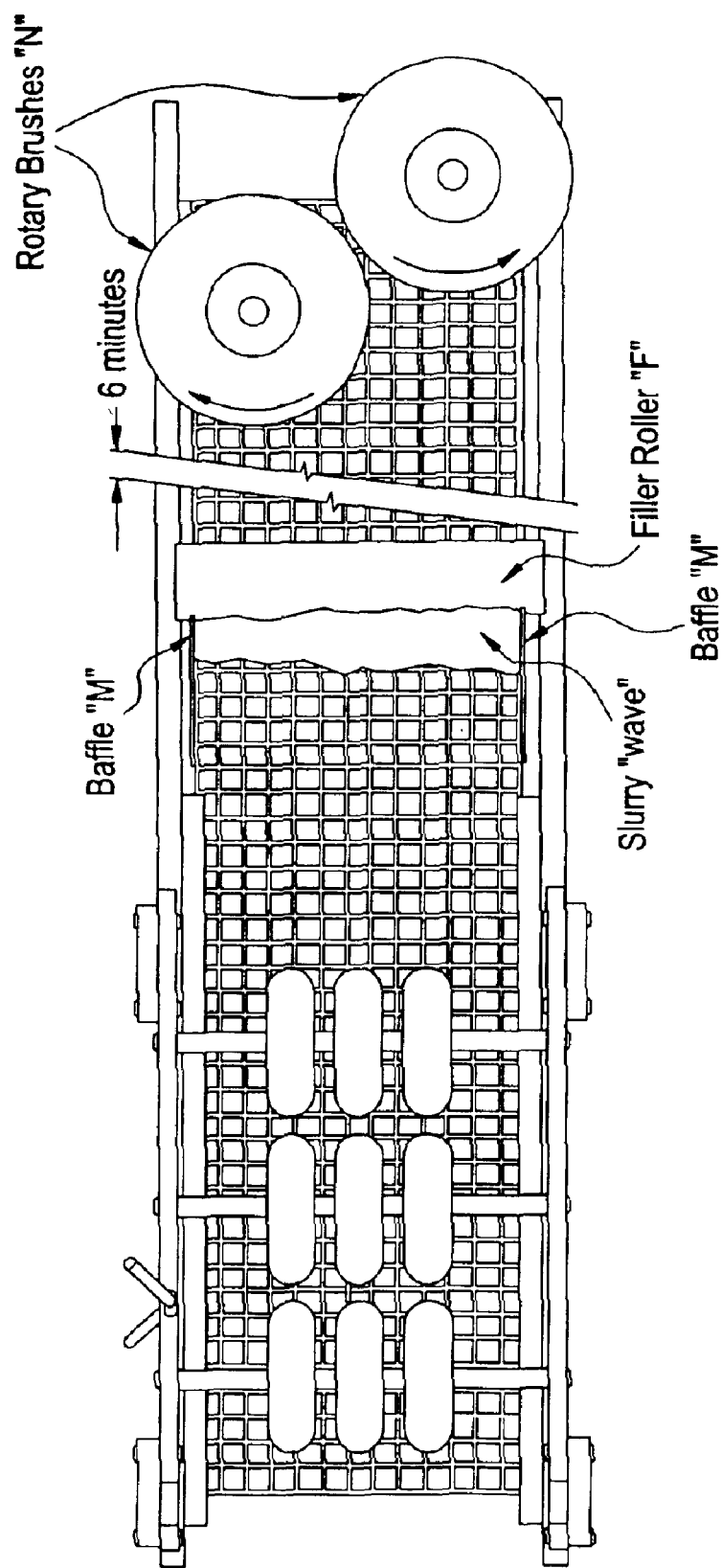
FIG. 2 depicts a schematic top view of an embodiment of a tray filling machine of the present invention.
Figure 3:
FIG. 3 is a photograph of an embodiment of a tray filling machine of the present invention.
Figure 4:
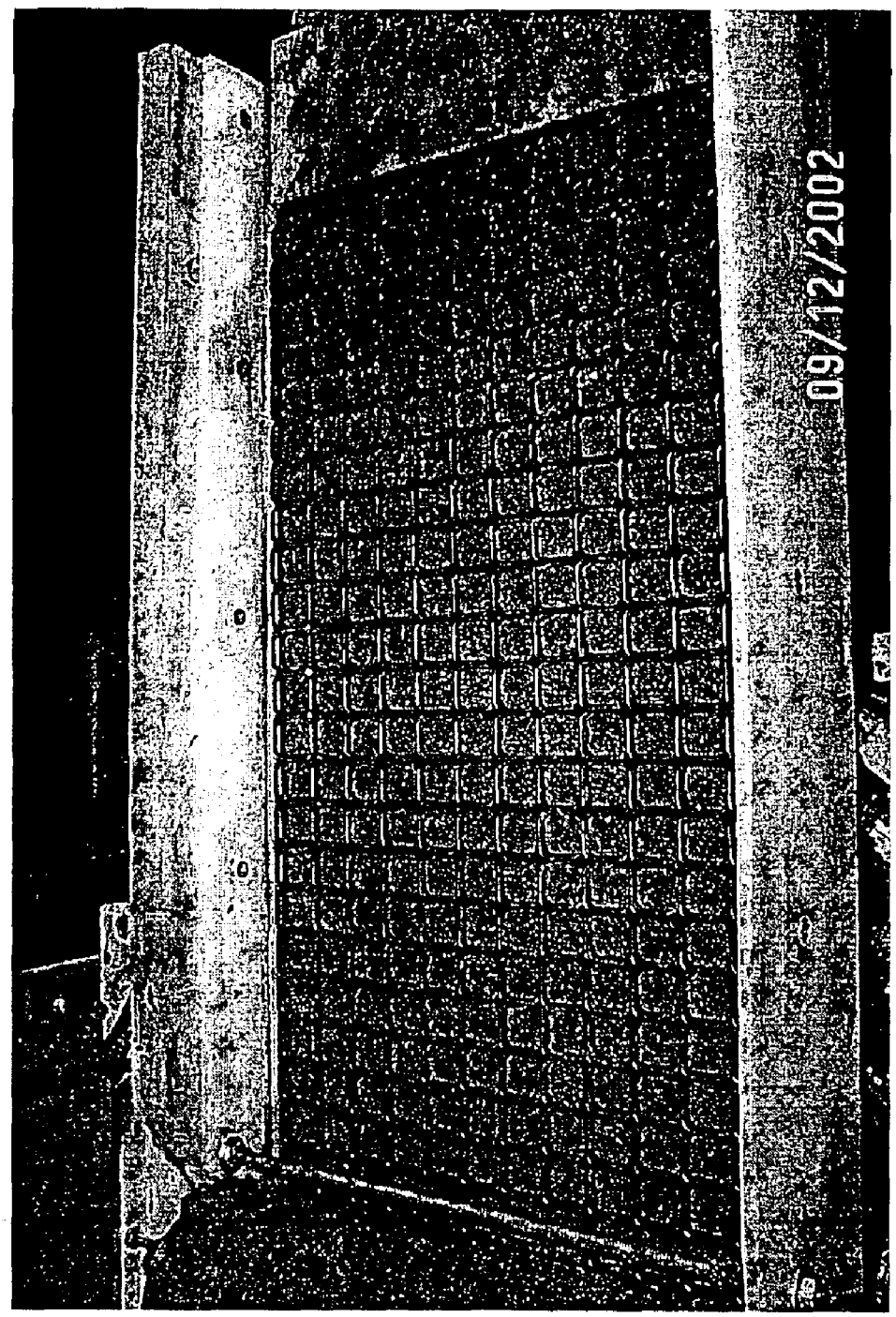
FIG. 4 is a photograph of an example of a tray after it has been filled using an embodiment of the tray filling machine of the present invention.
Figure 5:
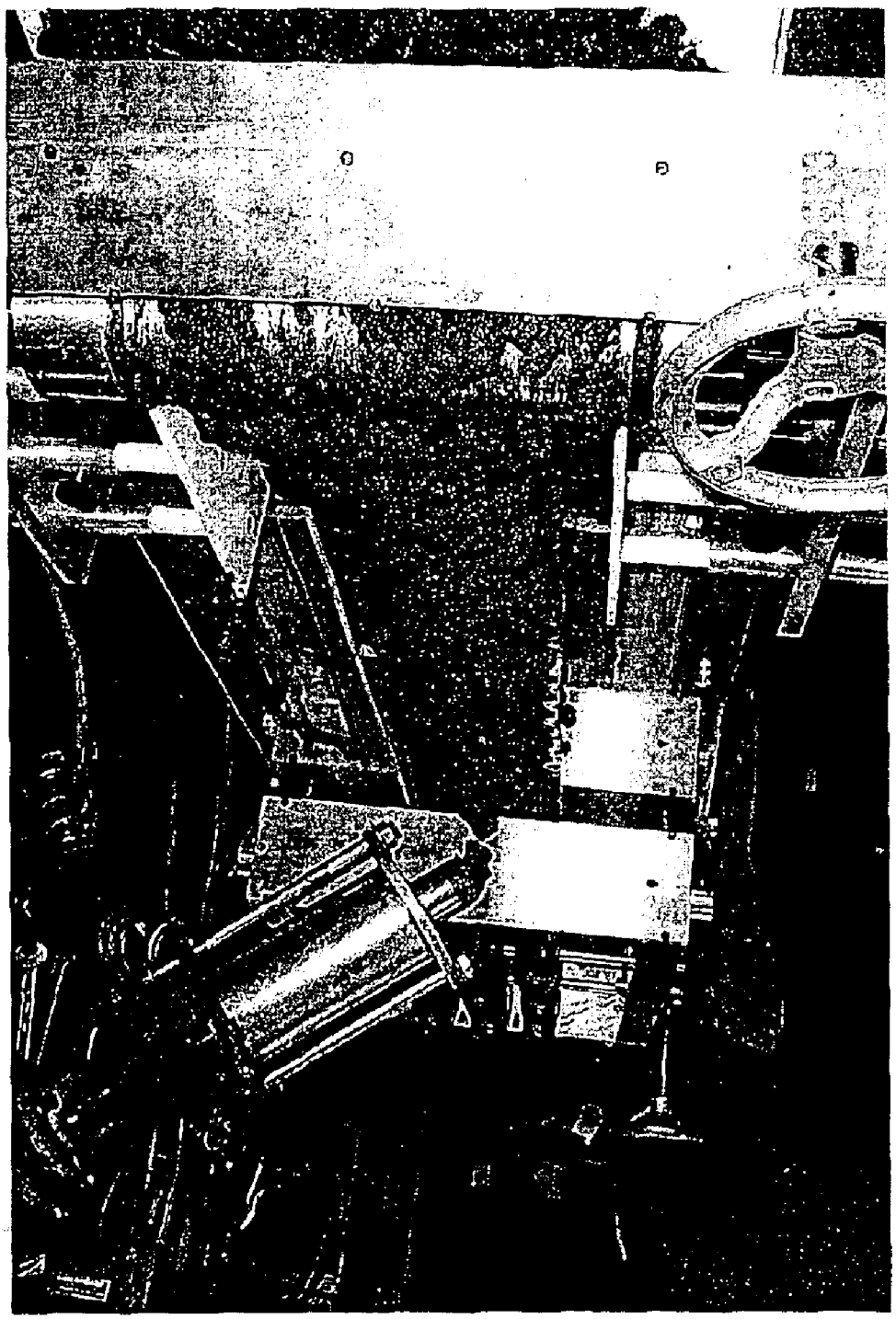
FIG. 5 is a photograph of an apparatus of the present invention being used in a method of the present invention.
Figure 6:
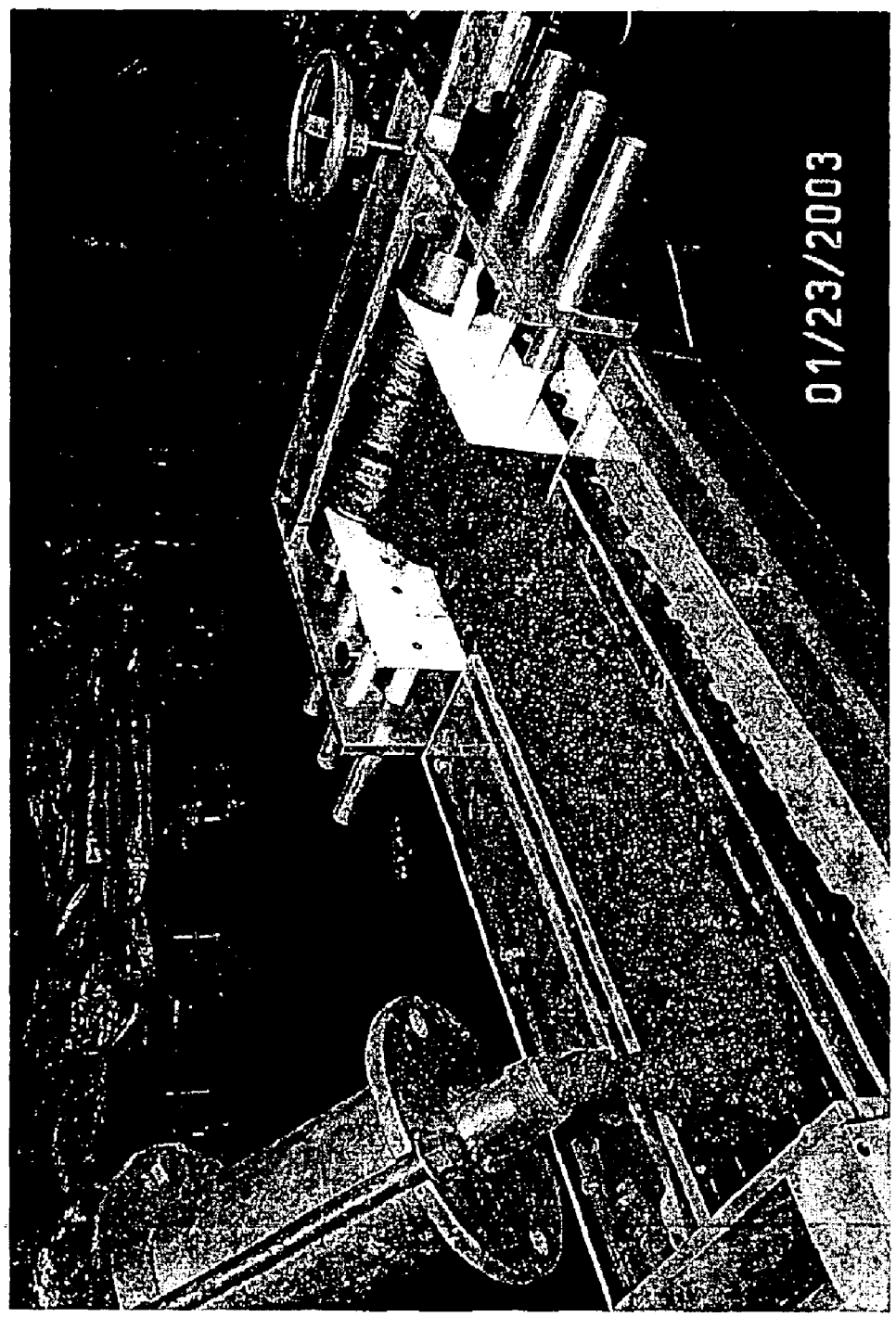
FIG. 6 is a photograph of an apparatus of the present invention being used in a method of the present invention.
Figure 7:
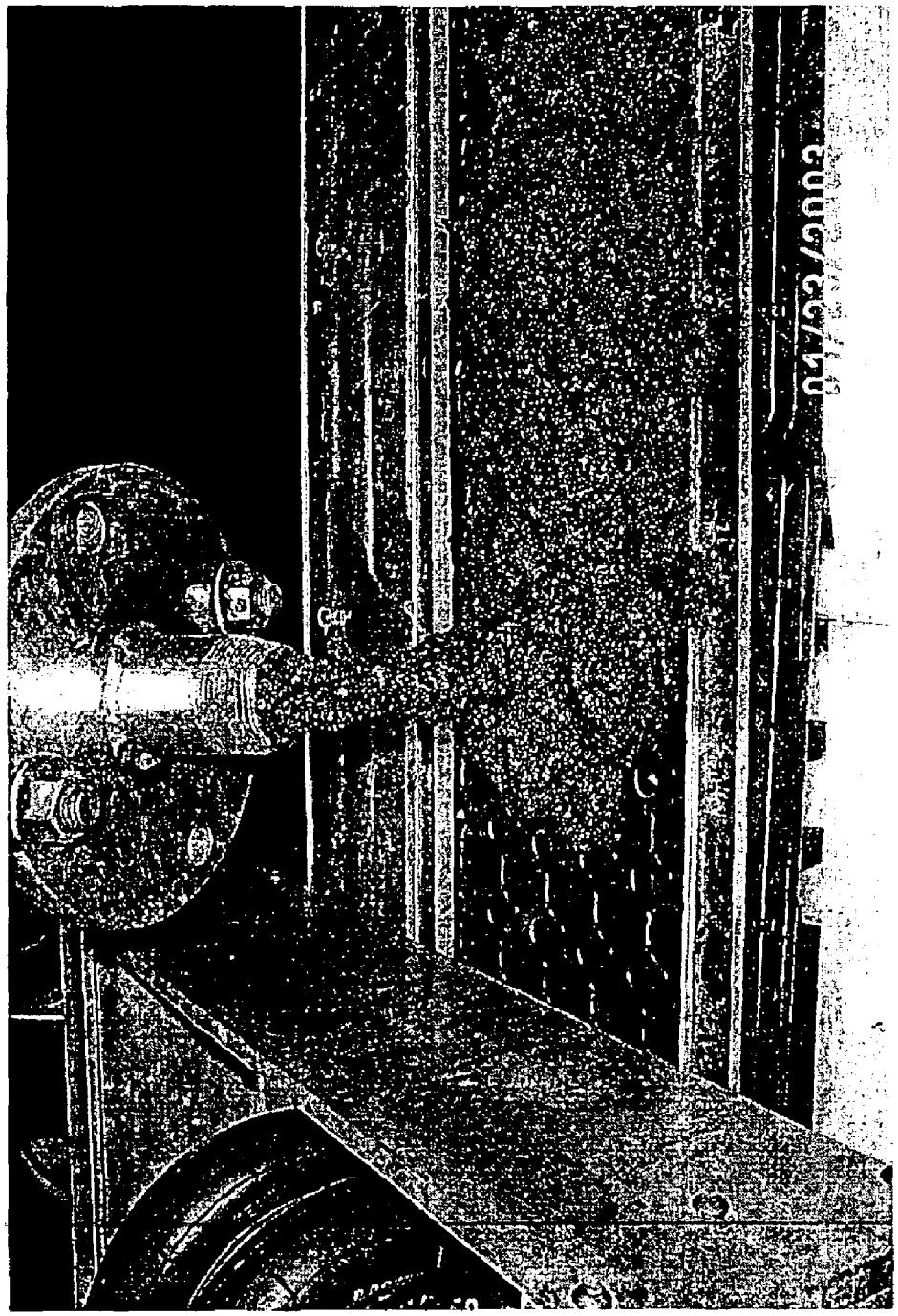
FIG. 7 is a photograph of an apparatus of the present invention being used in a method of the present invention.
Figure 8:
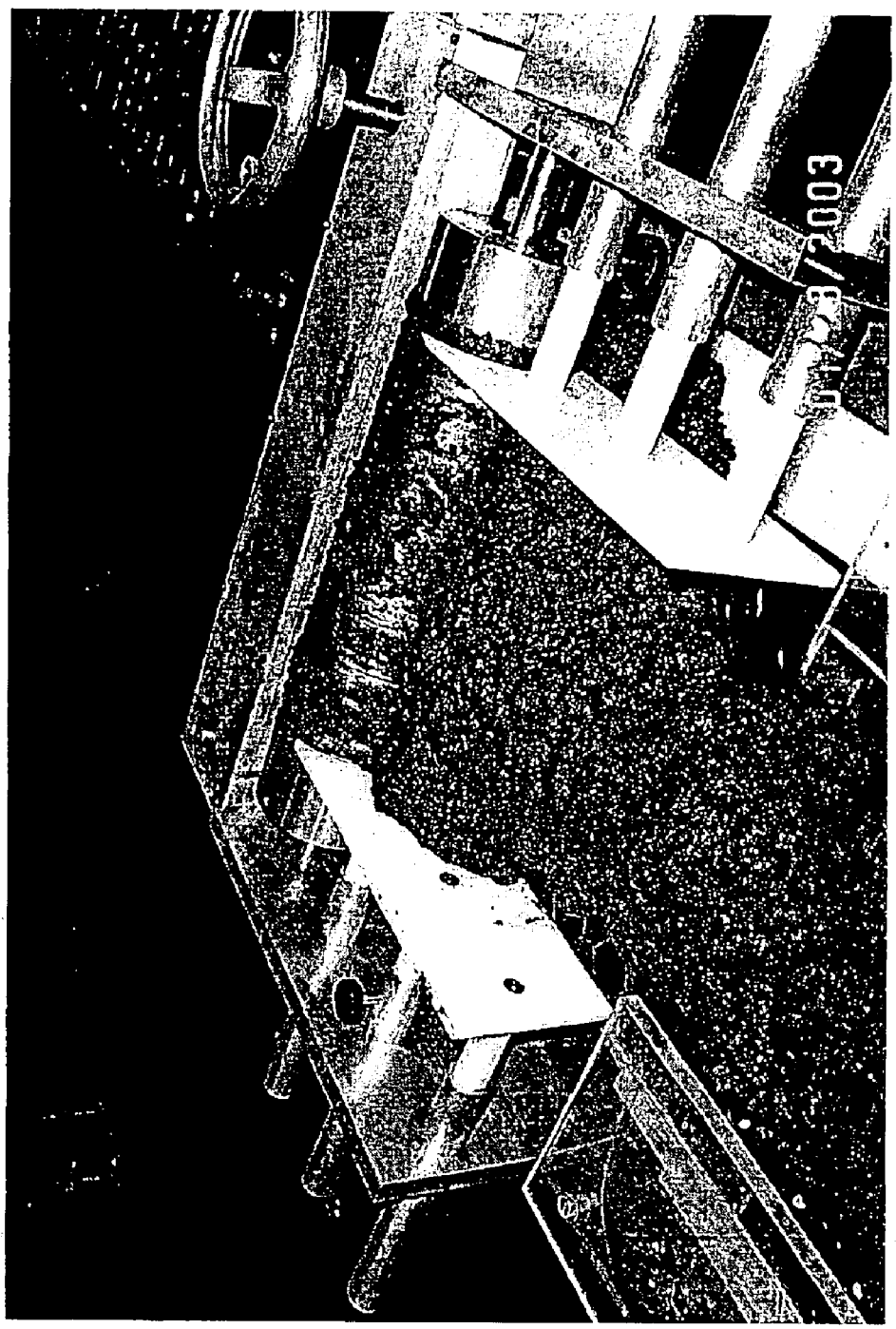
FIG. 8 is a photograph of an apparatus of the present invention being used in a method of the present invention.
Figure 9:
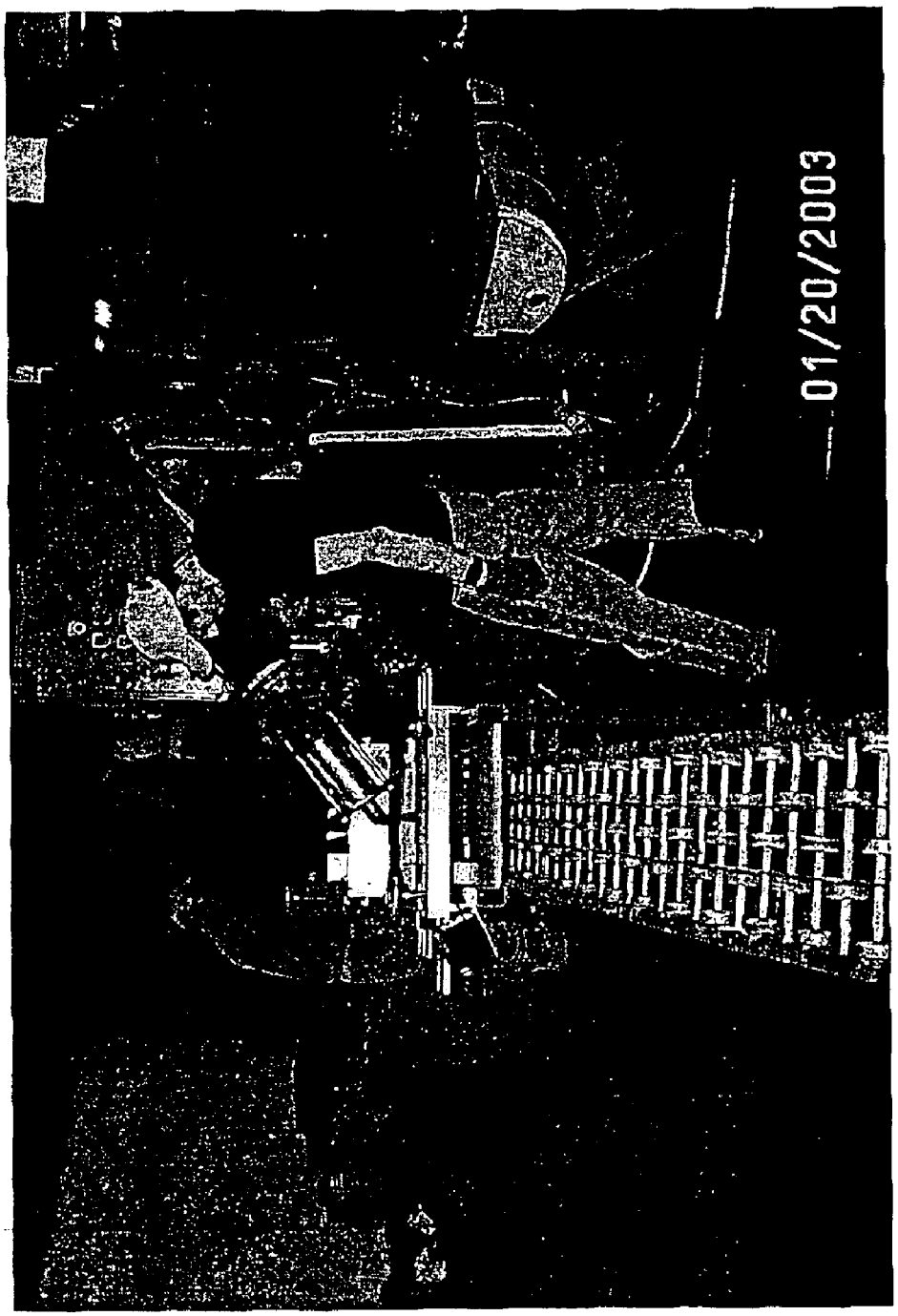
FIG. 9 is a photograph of an apparatus of the present invention being used in a method of the present invention.
Figure 10:
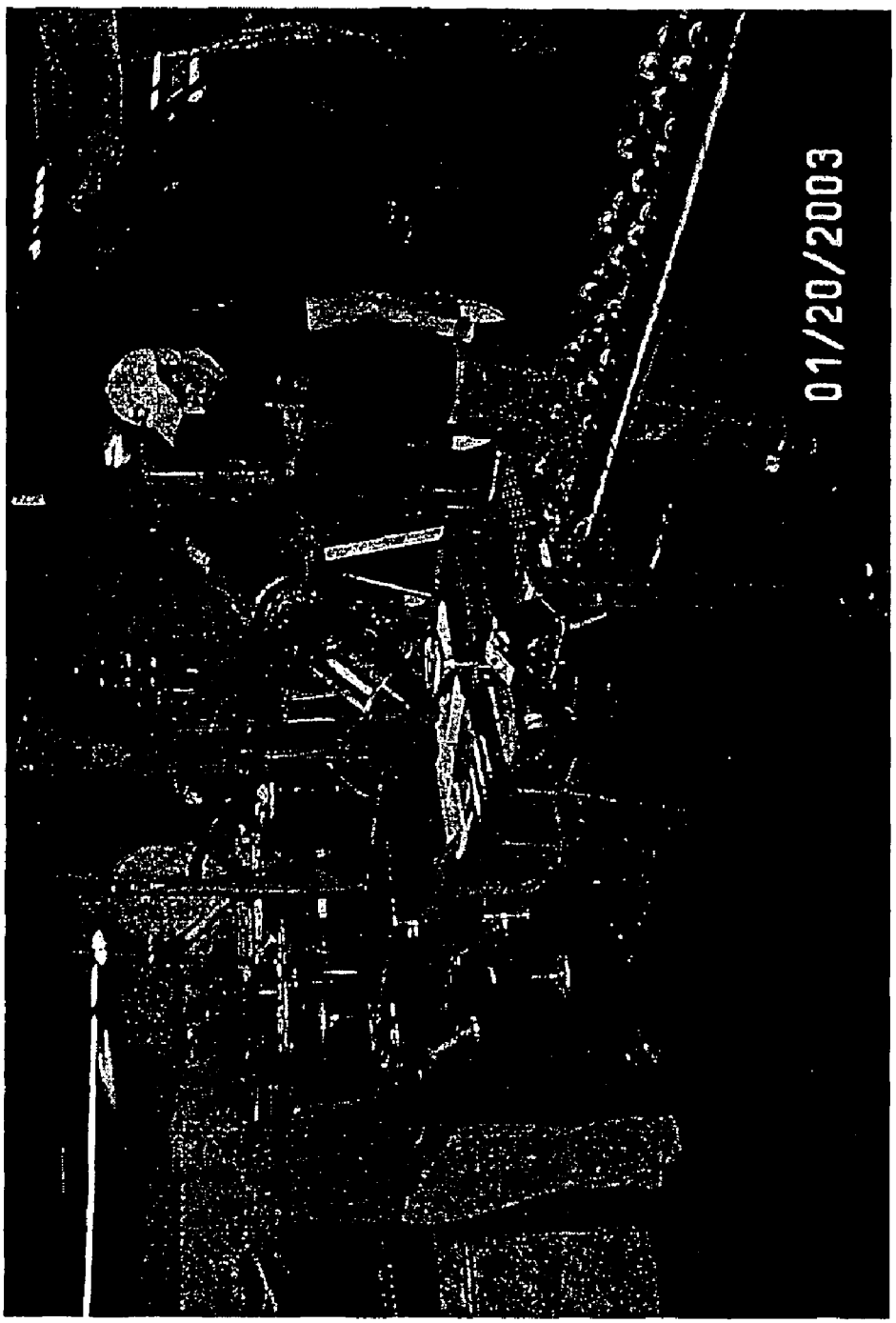
FIG. 10 is a photograph of an apparatus of the present invention being used in a method of the present invention.

Not shown in the Figures is a mixing chamber, in which the ingredients of the polymerized growth medium—in a preferred embodiment, a mixture of aggregate (including but not limited to peat, bark, coconut fiber, etc.), water, surfactant (e.g., lecithin, alkylsulfonates or phospholipids), and a polyurethane prepolymer, e.g., a hydrophilic polyurethane prepolymer—are combined, forming the slurry. In a preferred embodiment, the mixing chamber is mounted above the apparatus shown in FIGS. 1, 2, and 3. The slurry may be fed directly, or through a hose, from the mixing chamber to the slurry dispenser nozzle S (shown in FIG. 1B), provided that the slurry reaches the slurry dispenser nozzle before rising and curing of the slurry is complete.

In certain embodiments, a bed support plate K may be employed to support the tray R during filling. For example, when closed-bottom trays are used, the bed support plate K may provide additional support for the tray during filling. In certain embodiments, such a bed support plate also covers one or more openings at the bottom of an open-ended tray cavity, preventing the slurry from leaking out an opening during or after filling or both.

In certain embodiments, the bed support plate K comprises one or more surface features, e.g., a pin or rod perpendicular to the surface of the plate, that serve to anchor a tray to the bed support plate or occupy a hole in a tray, e.g., to prevent the slurry from passing through said hole, or both. For example, certain trays, due to the processes used in their manufacture, comprise a plurality of holes interspersed among their plurality of cavities; in certain methods of the present invention, complementary surface features on a bed support plate will fill the holes, preventing slurry from passing though them.

In still other embodiments, the present invention relates to a plurality of soil plugs in a nesting feature, and methods of making a nesting feature charged with a plurality of soil plugs, wherein said nesting feature comprises a plurality of cavities each comprising in its walls a plurality of holes. Such a cavity charged with a soil plug allows for the exploitation of air pruning of the roots of, e.g., a seedling, in said soil plug. For example, bed support plate K comprises or provides support for a nesting fixture. In general, a nesting fixture comprises one or more porous cavities, i.e., the surfaces that define the interior of a cavity comprise pores or holes. In certain embodiments, with respect to the interior of an individual cavity in the nesting fixture, the combined surface area of the pores is greater than the combined surface area of the solid portions of the interior of the cavity. In certain embodiments, the nesting fixture is removed from the growth plugs after polymerization of the slurry, providing growth plugs that are not housed in a tray or its equivalent. In certain embodiments, the use of a nesting fixture will allow the preparation of a growth plug in a shape or size or both that would be difficult or impossible to prepare using conventional trays, e.g., because the technology used to fabricate the trays is incapable of providing trays comprising cavities of the shape or size or both. In general, a relatively small number of nesting fixtures will be sufficient for the preparation of a large number of growth plugs because the growth plugs are removed from the nesting fixtures after polymerization of the slurry.

In certain embodiments, after the tray R passes through the top and bottom feed rollers P and J, it engages the bed support plate K, positioned under the fill roller F and extending upstream and downstream from the fill roller F through the filling region for a distance sufficient to accommodate the length of the tray being filled. The fill roller F is mounted above the bed support plate. In one embodiment, the fill roller F is mounted approximately fifteen inches downstream from the last feed roller. The fill roller F is motor driven and turns so that its lowermost point moves in the same direction as the tray R. The function of the fill roller F is to distribute the slurry over and into the tray cavities. A slurry dispenser nozzle S deposits the slurry in front of the fill roller F, forming a slurry wave L which the fill roller F rolls over and into the cavities. The wave is contained from side to side by baffles M, which may be adjustable to accommodate different tray widths.

The rotation rate of the fill roller F, as well as tray feed rate (the rate of linear travel of the tray R), may be independently adjustable. Varying the rotation rate of the fill roller F is one method of controlling the density of the growth plugs formed as the tray is filled. If the feet per minute rate of the circumference of the feed roller F exceeds the tray feed rate at the feed roller F, there is a tendency to pack more slurry into the tray cavities and thus create a more dense plug. Conversely, if the feed roller F rotates at a slower rate, such that the feet per minute rate of the circumference of the feed roller F is less than the tray feed rate at the feed roller F, the resulting growth plugs will be less dense. In a preferred embodiment, the fill roller has a vertical adjustment and can be set so as to make contact with the tray or, if desired, be raised above the tray so as to not only fill the cavities, but leave a mat of material above the top of the tray.

The action of the fill roller F upon the slurry wave L in pressing the slurry down into the tray cavities pushes down and back against the tray R, impeding its smooth advancement through the filling region. If a conveyor belt were used, the tray R would tend to stick beneath the slurry wave L, ceasing to advance as the conveyor belt slipped beneath the tray R. The use of the feed rollers J and P to propel the tray R though the filling region, rather than traditional conveyor means, can help combat the tendency of the tray R to stick. Because the feed rollers J and P grip the tray R with greater friction than a conveyor belt, they help ensure continuous forward motion of the tray R through the filling region, beneath the slurry wave L and fill roller F.

Because the rate at which the slurry rises and cures is dependent upon the temperature of the reaction, by controlling the temperature or the pH of the reactants or both, the feed rate of the trays through the filling machine, and the location of the slurry dispense nozzle S, one can control the degree to which the slurry has risen at the time it is rolled into the tray cavities. In a preferred embodiment, the slurry is 75% to 85% risen before it is rolled into the tray cavities, and then continues to rise after the cavities are filled, such that by the time the product is stabilized (e.g., six minutes), it protrudes above the tray cavity to a thickness of about $\frac{1}{32}$ to $\frac{1}{16}$ inch. The excess may then be removed by brushes N, which also granulate the removed material so it can be added back into the next aggregate batch. In some embodiments, an elevator, conveyor, or similar means may be employed to collect the excess polymerized growth medium and return it to the mixing chamber to be used in the formation of additional slurry. In the embodiment illustrated in FIGS. 1 and 2, the brushes N are counter-rotating rotary brushes; alternatively, brushes arranged on rollers or brushes that move laterally may be employed. The brushing procedure also removes any "skin" that may have formed on the top surface during curing, leaving an open-celled top surface that will readily accept water. In a preferred embodiment, the vertical clearance of the brushes N can be adjusted, such that after the excess material is removed the resultant plug is flush with the top of the tray or recessed below the top, depending on the configuration desired. In certain embodiments, the growth plugs are punctured or dibbled to facilitate the deposit of seeds, seedlings, or cuttings; this modification may be performed at any point prior to depositing the seeds, seedlings, or cuttings.

Exemplification

The invention now being generally described, it will be more readily understood by reference to the following examples, which are included merely for purposes of illustration of certain aspects and embodiments of the present invention, and are not intended to limit the invention.

EXAMPLE

Using the apparatus and methods described herein, a lot of 300 Landmark P-72 round cavity propagation trays were filled. This tray is a typical plug tray used in the greenhouse industry, which measures approximately 11 inches wide by 21 inches long and contains 72 cavities of 1¼ inch diameter by 1½ inch deep, configured in rows of six by twelve.

The trays were fed end to end through the tray-filling machine at a rate of 18 seconds per tray or 5.8 ft/min, and filled with media comprising a mix of 44% peat/water slurry, 44% composted bark/water slurry, and 12% hydrophilic urethane prepolymer. The temperature of the mix was between 87 F and 91 F with a pH of 5.6. The composted bark was previously granulated to a particle size of approximately ⅛ inch. The fill roller was set at a rate of 10.71 rpm, or 6.66 ft/min at the circumference.

The resultant filled trays were allowed to cure for approximately six minutes. After curing, any residual media was removed from the tray tops by rotary brushes, leaving the balance in the filled cavity flush with the tray surface. The filled cavities were then dibbled with a six millimeter pin to a depth of ⅝ inch to form a receptacle for inserting vegetative cuttings. A sampling of the completed plugs were removed from the trays and inspected for uniformity and integrity. The machine settings listed above yielded plugs with a density of 2.3 g/cc. The trays were then palletized and shipped.

Additional Patents and Publications Cited

1. U.S. Pat. No. 4,159,727.
2. U.S. Pat. No. 4,175,355.
3. U.S. Pat. No. 4,747,766.
4. U.S. Pat. No. 4,947,582.
5. U.S. Pat. No. 5,068,999.
6. U.S. Pat. No. 5,207,733.
7. U.S. Pat. No. 5,209,014.
8. U.S. Pat. No. 6,322,734.

Incorporation by Reference

All of the patents and publications cited herein are hereby incorporated by reference.

Equivalents

Those skilled in the art will recognize, or be able to ascertain using no more than routine experimentation, many equivalents to the specific embodiments of the invention described herein. Such equivalents are intended to be encompassed by the following claims.

What is claimed is:

1. An apparatus for filling trays with polymerized growth medium, comprising:

at least one top feed roller positioned above the top surface of a tray, and at least one bottom feed roller positioned below the bottom surface of a tray; wherein said at least one top feed roller and said at least one bottom feed roller propel a tray containing at least one tray cavity downstream through a filling region;

a slurry dispenser nozzle which deposits polymerized growth medium in a slurry state on the tray, positioned downstream of the feed rollers; and a filler roller, positioned downstream of the slurry dispenser nozzle, which distributes the polymerized growth medium into and over the at least one tray cavity.

2. The apparatus of claim 1, further comprising at least one brush, positioned downstream o the filler roller, which removes excess polymerized growth medium from the tray.

3. The apparatus of claim 2, wherein the at least one brush is a rotary brush.

4. The apparatus of claim 1, wherein:

the vertical position of the at least one top feed roller is adjustable; and the vertical position of the at least one bottom feed roller is adjustable independently of the vertical position of the at least one top feed roller.

5. The apparatus of claim 1, wherein:

the feed roller rotate at a feed roller rate;

the filler roller rotates at a filler roller rate; and the feed roller rate and the filler roller rate are independently adjustable.

6. The apparatus of claim 1, further comprising at least one brush, positioned downstream of the filler roller, which removes excess polymerized growth medium from the tray, and wherein the plurality of feed rollers further comprises at least one top feed roller positioned above the top surface of a tray, and at least one bottom feed roller positioned below the bottom surface of a tray.

7. The apparatus of claim 6, wherein:

the vertical position of the at least one top feed roller is adjustable; and the vertical position of the at least one bottom feed roller is adjustable independently of the vertical position of the at least one top feed roller.

8. The apparatus of claim 7, wherein:

the feed rollers rotate at a feed roller rate;

the filler roller rotates at a filler roller rate; and the feed roller rate and the filler roller rate are independently adjustable.

9. The apparatus of claim 5, wherein the plurality of feed rollers further comprises at least one top feed roller positioned above the top surface of a tray, and at least one bottom feed roller positioned below the bottom surface of a tray.

10. The apparatus of claim 9, wherein:

the vertical position of the at least one top feed roller is adjustable; and the vertical position of the at least one bottom feed roller is adjustable independently of the vertical position of the at least one top feed roller.

11. The apparatus of claim 10, further comprising at least one brush, positioned downstream of the filler roller, which removes excess polymerized growth medium from the tray.

12. The apparatus of claim 11, wherein the at least one brush is a rotary brush.

13. A method of filling a tray with polymerized growth medium comprising the steps of:

using an apparatus of claim 1, 2, 3, 4, 5, 6, 7, 8, 9, 10, 11, 12;

feeding a tray containing at least one tray cavity between at least one top feed roller and at least one bottom feed roller downstream at a tray feed rate through a filling region;

depositing the polymerized growth medium in a slurry state from a slurry dispenser nozzle onto the tray; and rotating a filler roller at a filler roller rotation rate to distribute the polymerized growth medium into and over the at least one tray cavity.

14. The method of claim 13, further comprising removing excess polymerized growth medium with at least one brush.

15. The method of claim 14, further comprising granulating the removed excess polymerized growth medium and returning it to a mixing chamber from which polymerized growth medium is fed to the slurry dispenser nozzle.

16. The method of claim 13, further comprising controlling the density of the polymerized growth medium in the at least one tray cavity by adjusting the filler roller rotation rate relative to the tray feed rate.

17. The method of claim 16, further comprising removing excess polymerized growth medium with at least one brush.

18. The method of claim 17, further comprising granulating the removed excess polymerized growth medium and returning it to a mixing chamber from which polymerized growth medium is fed to the slurry dispenser nozzle.

19. The method of claim 17, wherein the tray feed rate is selected so that approximately six minutes elapses between the step of depositing the polymerized growth medium and the step of removing excess polymerized growth medium.

20. The method of claim 18, wherein the tray feed rate is selected so that approximately six minutes elapses between the step of depositing the polymerized growth medium and the step of removing excess polymerized growth medium.

21. The method of claim 17, wherein the tray feed rate is selected so that the polymerized growth medium is substantially cured at the time of the step of removing excess polymerized growth medium.

22. The method of claim 18, wherein the tray feed rate is selected so that the polymerized growth medium is substantially cured at the time of the step of removing excess polymerized growth medium.

* * * * *